United States Patent
Bridges

[11] 3,733,129
[45] May 15, 1973

[54] LASER DISTANCE DETECTOR

[75] Inventor: William B. Bridges, Thousand Oaks, Calif.

[73] Assignee: Hughes Aircraft Company, Culver City, Calif.

[22] Filed: Feb. 1, 1971

[21] Appl. No.: 111,636

[52] U.S. Cl. ................................. 356/5, 250/199
[51] Int. Cl. ............................................ G01c 3/08
[58] Field of Search .................... 356/5; 343/14; 250/199

[56] References Cited

UNITED STATES PATENTS

| | | | |
|---|---|---|---|
| 3,412,251 | 11/1968 | Hargrove | 250/199 |
| 3,431,514 | 3/1969 | Oshman et al. | 250/199 |
| 3,191,171 | 6/1965 | Zuefeldt et al. | 343/12 R |

FOREIGN PATENTS OR APPLICATIONS

| | | | |
|---|---|---|---|
| 1,076,991 | 7/1967 | Great Britain | 356/5 |

Primary Examiner—Benjamin A. Borchelt
Assistant Examiner—S. C. Buczinski
Attorney—W. H. MacAllister, Jr. & Walter J. Adam

[57] ABSTRACT

A system utilizing a laser for accurately measuring range from a first position to a second position by providing a laser cavity having a reflective mirror at the first position and a target as the reflective mirror at the second position, and by detecting the occurrence of an induced optical mode locking condition in the laser cavity. The system phase modulates the energy in the cavity at a swept modulation frequency with the amplitude of the intermode beats or differences being detected to determine the effective length of the cavity. At phase modulation frequencies near $c/2l$ ($c$ is the velocity of light in the medium and $l$ is the length of the cavity) mode locking occurs in such phase relations that the beat signal appears to be a pure FM signal with a relatively small amplitude and at phase modulation frequencies at $c/2l$ a different type of mode locking produces a large amplitude signal, either of which conditions may be utilized to provide a scaled value of $l$ or range.

13 Claims, 3 Drawing Figures

LASER DISTANCE DETECTOR

BACKGROUND OF THE INVENTION

1. Field of the Invention

This invention relates to range measuring systems and particularly to a simplified laser range finder that with a high degree of accuracy, provides either manual or automatic range measurement.

2. Description of the Prior Art

It has been shown by Hargrove, Fork and Pollack in Applied Physics Letters, Volume 5, Number 10, pp 4-5, July 1, 1964, that if a laser of length $l$ and therefore of longitudinal mode spacing $c/2l$ is amplitude modulated at a synchronous frequency $c/2l$ within the cavity resonator, the longitudinal modes, which are normally independent, will lock together, that is, signals from all of the modes add in phase once every cycle of frequency $c/2l$. If the output of such a locked laser is examined with a photomultiplier by looking at the beat notes between modes, a strong noise free beat note at $c/2l$ may be heard. With the modulation changed to a different frequency, hashy and complex beat notes are provided. If the intracavity modulator is a phase modulator rather than an amplitude modulator, a different kind of locking takes place, as discussed by Harris and Targ, Applied Physics Letters, Volume 5, Number 10, page 202, Nov. 15, 1964. The modes lock together in such phases that the resulting output appears to be pure frequency modulation (FM) with modulation frequency $c/2l$ and deviation approximately the width of the gain curve. As a result of the phase relation into which the modes lock, the resultant signal near the beat frequency $c/2l$ has zero amplitude, i.e., the beats between the various sidebands of the FM locked laser add exactly to zero. The locking occurs when the intracavity modulation is driven close to the frequency $c/2l$ resulting in an abrupt quenching of substantially all of the original laser beat notes. If the phase modulation is substantially exactly at the frequency $c/2l$, an axial mode locking condition similar to that of amplitude modulation is produced. Also in the prior art, mode locking as a result of phase modulation has been observed over long length laser cavities, which may have a mirror at one end and a retro-reflector at the other end. It would be an important advance to the range measuring art if mode locking of lasers could be utilized to accurately measure range. Conventional laser range measuring systems transmit pulses of energy to a target and count the time elapsed before return of the energy pulse, which arrangements have well known limitations as to accuracy, such as the width of the transmitted pulse.

SUMMARY OF THE INVENTION

Briefly, the range measuring system in accordance with the invention includes at the interrogating location, a portion of the laser cavity of a multi-mode laser having a semi-reflective mirror at one end, a laser amplifying element such as a gas tube or solid state rod and a suitable cavity phase modulator controlled by an external modulation frequency source. The external mirror or target reflector to which the range is being measured provides the second mirror surface of the cavity. External to the cavity and responsive to the signals passed through the first mirror, a photomultiplier, tracking receiver, envelope detector and a low pass filter develop a signal representative of the intermode beat amplitude of all of the differences developed by the cavity modes which may be at the frequency $c/2l$ the reciprocal round trip travel time. The amplitude signal from the low pass filter is applied with a signal from the modulation frequency source to a range detection arrangement. The modulation frequency source is varied until, near the modulation frequency $c/2l$, the beat amplitude falls below a threshold value indicating that a scaled value of the modulation frequency is representative of the length of the cavity or the range to the target. For greater range accuracy, the cavity is modulated at the synchronous frequency, that is, substantially at the reciprocal round trip travel time.

It is therefore an object of this invention to provide a system for measuring range to an object with a high degree of resolution.

It is a further object of this invention to provide a laser range measuring system that provides accurate range measurement at relatively low power levels and with a minimum of equipment.

It is another object of this invention to provide a laser distance detector that utilizes mode locking of a multi-mode laser for measuring range.

It is still another object of this invention to provide a laser distance measuring system utilizing continuous wave laser energy.

BRIEF DESCRIPTION OF THE DRAWINGS

These and other objects, features and advantages of the invention itself, will become apparent to those skilled in the art in the light of the following detailed description taken in consideration with the accompanying drawings wherein like reference numerals indicate like or corresponding parts throughout the several parts wherein.

DESCRIPTION OF THE PREFERRED EMBODIMENT

Figure 1:
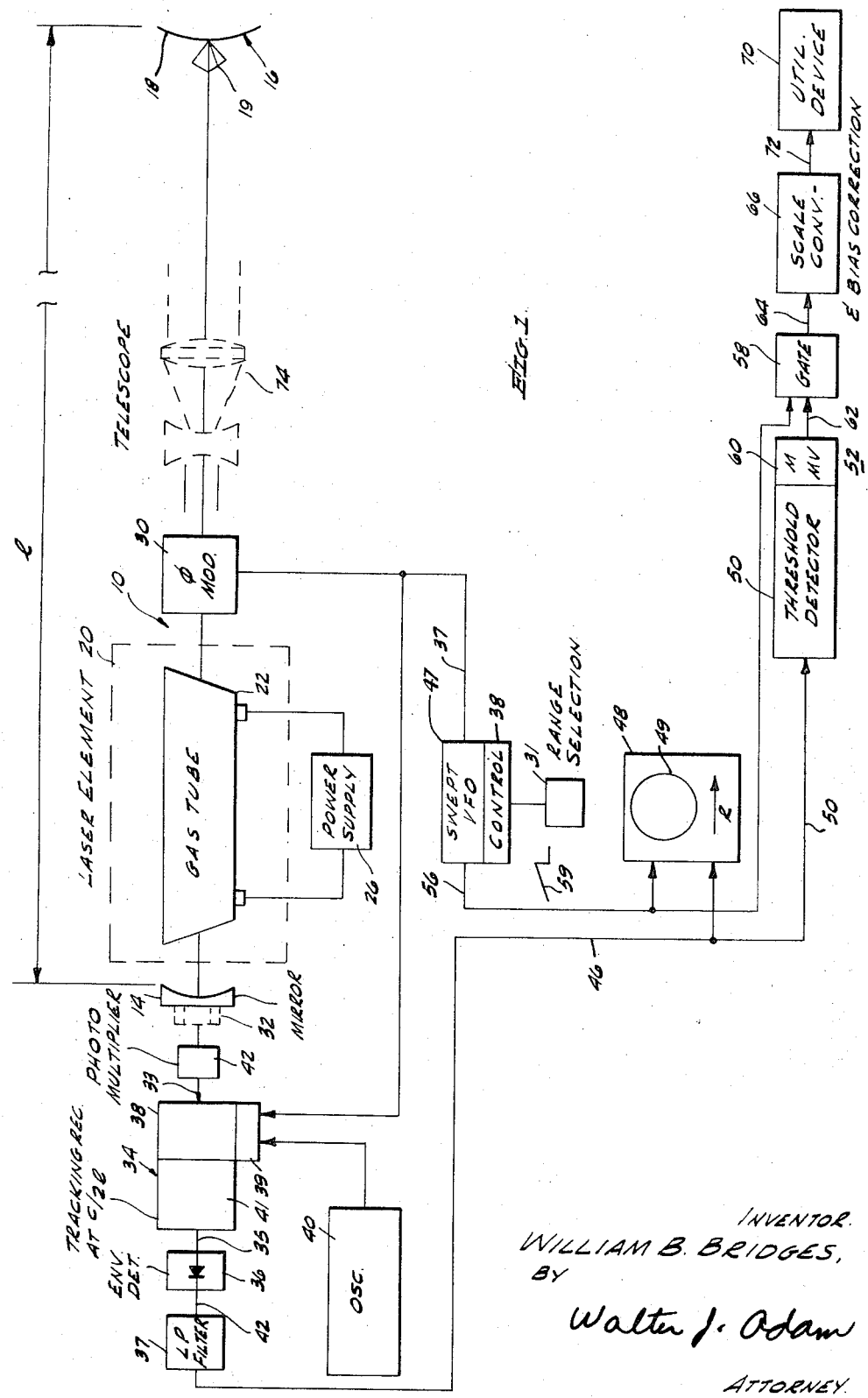
FIG. 1 is a schematic block diagram of the laser distance detector system in accordance with the principles of the invention.

Referring first to FIG. 1, the laser range finder includes a translation cavity 10 extending between a mirror 14, which may be a semi-reflective type spherical reflector, and an object or target 16 providing a reflector 18 which in some utilizations of the system, may be a suitable retro-reflector such as a corner cube 19 or may be only the reflector surface 18. The range or distance $l$ that is measured in accordance with the invention, is between the mirror 14 and the reflector 18. For measuring range to objects with suitable reflectivity such as an aircraft or vehicle surface, a retro-reflector may not be required. However, when measuring distance to a vehicle on which a retro-reflector such as a corner cube 19 may be installed, the system may operate with a decreased energy loss in the cavity. A laser element or active element 20 is provided which may be a suitable amplifying medium formed from a gas tube or vacuum envelope 22 with optical flats at the end thereof oriented at the Brewster angle and with a gas medium therein. The gas which, for example, may be a helium-neon mixture may be excited by a suitable power supply 26 using appropriate electrodes in the tube. The energy provided by the electrodes stimulates the transfer of excitation from helium to neon atoms, for example. It is to be noted that the laser element 20 may be of any suitable gaseous type such as helium-neon, carbon-dioxide or xenon or may be of a solid state type such as a pink ruby. As is well known in the art, when solid state rods are to be energized, a suitable flash tube is utilized for excitation of the ions in the solid material. The range that may be measured is substantially independent of the type of laser element as long as the laser cavity has sufficient atomic gain to overcome all cavity losses, including atmospheric attenuation. The range measuring system may include a suitable tracking or pointing arrangement (not shown) for aligning or maintaining alignment with the target 16.

Included in the cavity 10 is a phase modulator 30 which may be a gallium arsenide or cadmium telluride crystal positioned in the cavity and oriented with its optic axis parallel to the axis of the laser tube and with one of its electrically induced principal axes in a direction that is parallel to the laser polarization. The crystal is anti-reflection coated and positioned in a tuned circuit for responding to a radio frequency source to introduce a phase perturbation, which type of modulator is well known in the art. Also, a $KH_2PO_4$ (KDP) crystal may be utilized as is well known in the art. The choice of phase modulator depends on the wavelength of the laser. Another type of modulating scheme is a piezoelectric ceramic 32 (in the shape of a ring) modulating the mirror 14. Modulation at suitable frequencies may also be provided by other electromechanical arrangements such as a loudspeaker voice coil. A swept variable frequency oscillator (VFO) 47 provides a variable frequency source for applying a frequency modulated signal through a lead 37 to the phase modulator 30 and through a lead (not shown) to the material 32 when that type of modulation scheme is utilized. A control source 38 provides timing to initiate the frequency excursions of the VFO 47 and may be manually or automatically controlled. A range selection unit 31 coupled to the control unit 38 provides either manual or automatic selection of different frequency excursions for the sweep signals so as to develop the frequency modulation to correspond to a large range interval and may also be coupled to other necessary units such as the oscillator 40, the mixer 39 and the tracking receiver 34.

For detecting the amplitude of the beat notes or difference signals between the different cavity axial modes, an arrangement is provided at the output of the semireflective mirror 14 (or other suitable signal sampling arrangement) including a photomultiplier 42 to develop a signal including all possible difference signals. It is to be understood that the mirror 14 does not have to be semireflective, as other arrangements may be utilized to sample the energy in the cavity such as a tilted plate in the cavity operating as a low loss beam splitter, to divert some of the energy to the photomultiplier, or if appropriate, using the back scatter passing out of the cavity as the energy applied to the photomultiplier. The difference signals developed by the photomultiplier 42 are applied through a lead 33 to the tracking receiver 34 which may be considered a tracking filter for tracking the frequency $c/2l$ over the different ranges to be measured. The tracking receiver may include a mixer 38 in turn driven by a mixer 39 which sums the signal from a fixed frequency offset oscillator 40 and the VFO signal from the lead 37. The mixer 38 is followed by a suitable IF amplifier strip 41 which passes the frequency near that of the oscillator 40. Thus the signals provided on a lead 35 at the output of the tracking receiver 34 are only the difference signals at or near the frequency $c/2l$. An envelope detector 36 responds to the signal on the lead 35 to provide an envelope signal on a lead 42 which in turn is applied through a low pass (LP) filter 37 to a lead 46. The LP filter 44, which may have a passband extending from DC (direct current) to 10 hertz, for example, provides a limit to the speed of sweeping through a selected range interval of the VFO 47 while determining a range indication condition. The beat amplitude signal is applied through the lead 46 to a visual display unit 48 as well as to a threshold detector 50 of an automatic range detector unit 52. The display unit 48, which may include a suitable cathode ray tube 49, also receives a swept voltage 59 on a lead 56 from the VFO 47, the voltage sweep being representative of the frequency variation on the lead 37 and being applied to the X dimension control circuits for the tube 49. The detected amplitude on the lead 46 may be applied to the Y dimension control circuits for the tube 49.

In the automatic range measuring unit 52, a monostable multivibrator (MMV) 60 responds to a signal meeting the threshold condition in the detector 50 to apply a gating pulse of a predetermined duration to a gate 58 which samples the voltage ramp 59 received on the lead 56. The gate 58 passes a segment of the ramp voltage 59 through a lead 64 to a scale conversion and bias correction circuit 66, which converts the voltage to range and in one mode of operation, adds a bias range to correct for the finite duration of the attenuated beat signal developed in the laser cavity 10. A utilization device 70 which receives the range signal on a lead 72 may be a computer, a display or a control unit depending upon the type of system in which the range finder of the invention is utilized. Suitable timing may be provided between the detector 50, the converter 66 and the utilization device 70. It is to be noted that a correction for the difference of the velocity of light in air and the velocity of light in a vacuum may be provided. Also, it is to be noted that the principles of the invention are applicable to mediums other than air such as water. It is to be understood the principles of the invention are applicable to any suitable automatic detection scheme and are not limited to the illustrated arrangement.

For increasing the gain of the laser cavity, an optical expander or telescope 74, shown dotted, may be utilized in some arrangements in accordance with the invention, to provide increased energy transmission by collimating the light and increased reception by providing a large collection area of energy from the part of the cavity between the range measuring source and the object 16. This type of optical expander is well known in the art and will not be explained in further detail.

Figure 2:
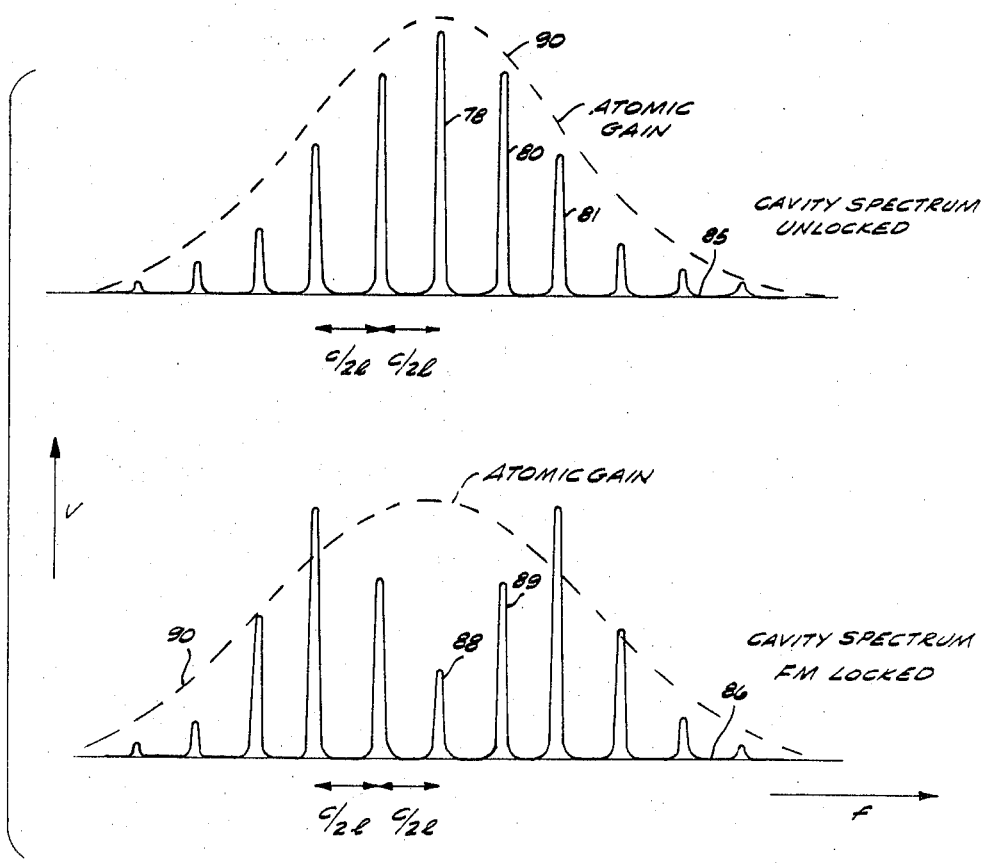
FIG. 2 is a spectral diagram of frequency versus amplitude showing the axial modes in the laser cavity for the unlocked and the FM locked conditions.

Referring now to FIG. 2, which shows, as seen with an optical spectrum analyzer, the natural cavity spectrum 85 for the modes in the unlocked condition and the natural cavity spectrum 86 for the locked condition. The spectrum 85 shows the lines of each axial mode in the cavity with the center mode line having the largest intensity. The mode lines such as 78 and 80 do not have definite or specific phase relations. A curve 90 represents the atomic gain of the laser cavity which must be sufficient to overcome all cavity losses. As is well known in the art, a sufficient amplitude of phase modulation must be developed to provide mode locking. Because the phase modulation requirements are a function of range, gain and loss, the phase modulation index in some arrangements in accordance with the invention, may be adjusted or controlled as a function of range and possibly atmospheric conditions. When the cavity is phase modulated, the spectrum 86 represents a locked condition with the liens such as 88 and 89 having a Bessel function amplitude distributed and the phases of the lines having an FM relationship. In the mode locked condition, all modes adjust themselves in amplitude and phase so that they appear to be an FM spectrum of a single frequency laser, that is, modulated by a phase modulator of the appropriate modulation index. The spacing between the unlocked mode lines of the spectrum 85 is approximately $c/2l$ and the spacing of the locked mode lines is exactly $c/2l$. As is well known in the art, each mode in the cavity is like a transverse electromagnetic mode. Each of the modes as shown in FIG. 2 are modes with a different axial mode number or index and should all be selected with the same transverse mode number or index. A practical embodiment of this system may require operation in the lowest order (TEMoo) mode.

In the system of the invention, the mixing of the adjacent lines such as 78 and 80 for the unlocked condition and such as 88 and 89 for the locked condition, provide beat notes at the frequency $c/2l$ which may be utilized for determining range. Also, all of the lines interact to provide beat notes at different frequencies which are of lesser amplitudes than those difference signals centered at $c/2l$. Beat notes at other frequencies such as $2c/2l$ or $3c/2l$ may be utilized for range measuring in the system of the invention by suitable modification of the detection system in accordance with the particular behavior of the chosen beat note amplitude. Behavior of higher order beat notes may, in general, be different from that shown in FIG. 3. For the FM locked spectrum near $c/2l$ the phases of each line are such that the beat notes are not present as they are cancelled or quenched. For ranging in accordance with the invention, the laser must be on or operating CW (continuous wave) during the entire sweep time of the swept VFO 36.

Figure 3:
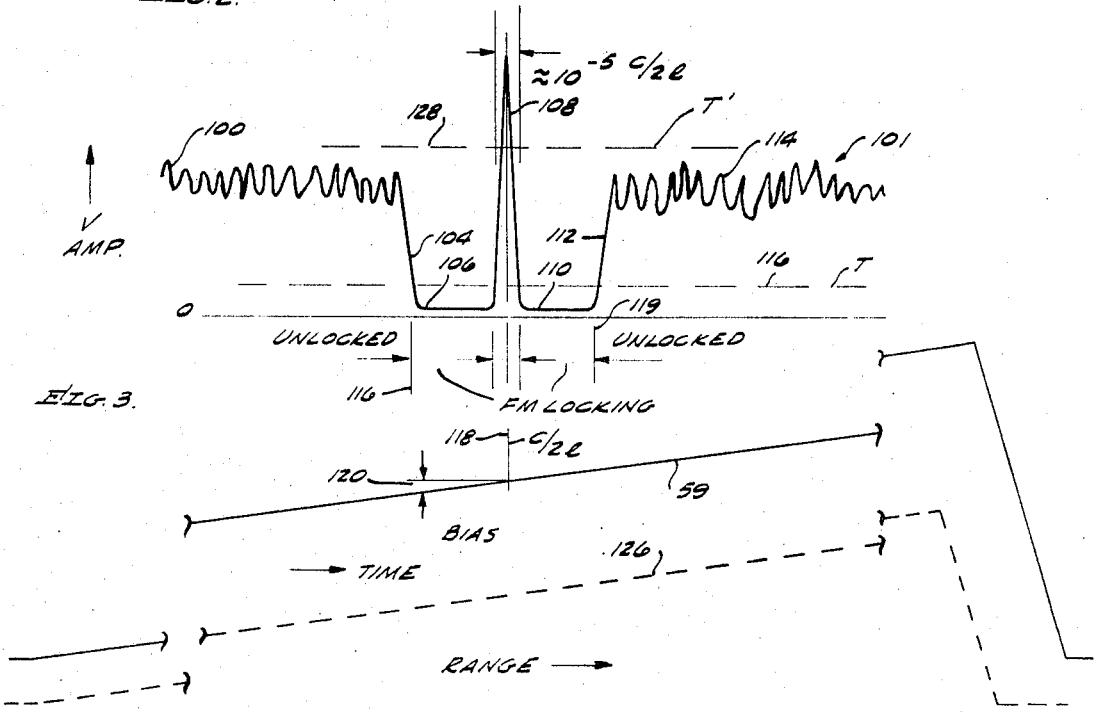
FIG. 3 is a diagram of time and range versus voltage amplitude for explaining the intermode beat amplitude changes utilized to determine range.

Referring now to FIG. 3, a line 100 of a signal 101 represents the beat note amplitude on line 46 in which the adjacent spectral lines in the cavity do not have coherent phase relations which is an unlocked mode condition. Upon phase modulating the cavity to the correct value for the cavity length or range by sweeping the VFO 36 through the frequency $c/2l$ as indicated by the voltage line 59, representing the frequency variation, the FM mode locking condition first occurs near a time 116 and the level of the beat signals on the lead 46 rapidly falls at 104 to a level 106. This level 106 is maintained until a point near the beat frequency $c/2l$ is reached at which an amplitude locking condition occurs, causing the composite beat signals to provide a peak spike 108 at a time 118. The spike falls to a level 110 shortly after reaching its peak. The level 110 is maintained until the modulation change causes the beat frequency near a time 119, to change as a result of the cavity rapidly going back into an unlocked condition, with the amplitude level rising at 112 to a composite level 114 substantially the same as the level 100.

Referring now also to FIG. 1, all possible differences appear at the photomulitplier output of the lead 33, but because of the tracking receiver 34, only the differences in a selected range around $c/2l$ appear on the lead 35. After envelope detection, the low pass filter 37 passes only the DC and near DC amplitude of the envelope to the lead 46, which is the signal 101 of FIG. 3. For operation to detect the level 106, the threshold detector 50 has a threshold T level 116 which when exceeded provides a signal to energize the monostable multivibrator 60 to pass a pulse to the gate 58 which in turn samples the voltage ramp 59 at time 116. The scale converter 66 provides a bias correction such as through a voltage divider that increases the voltage 59 an increment 129 so that the voltage represents the frequency $c/2l$ or time 118. The scale converter converts the voltage of the waveform 59 to a range scale which is an increment of a curve 126 shown to indicate the correspondence between the voltage ramp 59 and the range scale 126. It is to be noted that the bias correction may be either before or after the scale conversion to range in the converter 66. Thus a signal either of analog or digital type is provided on the lead 72 representative of $l$ or the range to the target, which signal is applied to the utilization device 70. If the range is desired from the target to the front of the ranger system, a constant distance may be subtracted from the distance $l$.

For operation to detect the pulse 108 which appears at $c/2l$, a threshold 128 may be provided in the detector 50 instead of 116, and upon the spike 108 exceeding this threshold T', the multivibrator 60 samples the ramp voltage 59. In this arrangement the bias correction is not normally utilized in the scale converter 66 and the scale converted signal on the lead 72 represents the beat frequency $c/2l$. The display 48 displays am amplitude versus range indication similar to 101 and the operator can read the range directly from a range R scale at the time 118 position. The invention is not limited to the illustrated readout or automatic detection schemes, but other suitable arrangements are included within the scope of the invention. Also, within the scope of the invention, either the zero amplitude level 106 or 110 or the pulse 108 may be utilized for determining range either in parallel, selectively or concurrently by suitable circuit modifications.

For operation at different ranges the range selection switch 31 may select other sweep frequencies and other sweep ranges. The swept VFO 36 and the mixer 38 as well as other controlled units may be either varied or suitable parallel units selected when operating over a wide variance of range. For example, for determining a short range between two vehicles, for a range of 5 to 20 meters, the oscillator 36 may have a range of from 7.5 to 30 MC. For determining a range between 0.5 to 2 Km, the oscillator may have a sweep range of 75 to 300 KC. The system of the invention is applicable to any range if there is sufficient cavity gain and if the cavity is phase modulated at a frequency $c/2l$.

The system of the invention operates with any laser that has sufficient gain to overcome the cavity losses, which losses include the atmospheric attenuation, loss by scattering and loss by poor reflectivity of the target. For different laser mediums such as helium-neon, carbon-dioxide, xenon or pink ruby, the system must be designed so that phase modulation may be performed at $c/2l$ over the desired range to be measured. When applying a bias to correct for measurement of the time 116 (FIG. 3) which is the condition of the beats adding to zero, the width of the quenched area between 116 and 119 may be either determined experimentally or by analysis. When utilizing the peak 108, the width of the spike has been found to be substantially $10^{-5c/2l}$ if a bias is to be desired for further accuracy in range. The speed at which the range can be measured (or rate of sweeping the VFO 36), when sensing the beat note cancelling condition, is a function of the time width between 116 and 118, because the low pass filter 37 must have at least this time constant. A limitation in rate of measurement or VFO sweep rate is also present when utilizing the threshold 128 to sense the spike 108. Thus the speed of the sweep is limited by the time necessary to detect the mode locking conditions. Also, at some ranges the mode locking time which requires a plurality of round trip transit times may be considered in determining the allowable rate of sweep past the sweep frequency $c/2l$. It is believed that for a transient or moving target, there may be a limit for each system as to the rate of target motion that can be accurately measured. The allowed sweep rate for a moving target may be found by experimentation with a moving target.

Thus there has been described a range determining system for a multimode laser that detects mode locking either near or at the $c/2l$ frequency and provides a measurement of $l$ the range to the other cavity reflector or target. The sum of all differences or beat notes add randomly in the unlocked mode condition, add to approximately zero in the locked condition when the cavity is phase modulated near $c/2l$ and the beat notes add in phase to provide a strong signal when the cavity is phase modulated at $c/2l$. The detection of range can be by displays or by an automatic detection system. A feature of the invention for additional gain is to use an optical telescope structure to collimate the light energy transmitted into space. The system provides reliable and highly accurate range measurement because the range resolution is not limited to a function of a transmitted pulse width as in conventional laser rangers.

What is claimed is:

1. A ranger for measuring range to an object comprising
   a laser having an amplifying element and a reflective element positioned to provide a reflective path to said object, said reflective element and said object forming a cavity capable of supporting modes with a plurality of axial mode indices,
   modulating means for phase modulating the energy in said cavity,
   detecting means responsive to selected beat notes developed in said cavity for providing a signal representative of mode locking in said cavity,
   and means responsive to said detecting means and said modulating means for indicating range from said reflective element to said object.

2. The combination of claim 1 in which said modulating means is capable of phase modulating the energy at a frequency $c/2l$ to provide a mode locking condition where $c$ is the velocity of light in the cavity and $l$ is the range from said reflective element to said object, and in which said means is responsive to said detecting means and responds to the signal from said detecting means falling in amplitude at said mode locking condition.

3. The combination of claim 1 in which the modulating means provides phase modulation over a selected frequency range and said means responsive to said detecting means is coupled to said modulating means and includes threshold detecting means and scale conversion means for responding to the modulating frequencies at the condition of mode locking in said cavity to develop a signal representative of range.

4. A system for measuring range from a first position to a target surface, said system comprising
   a reflective element at said first position pointed to define a laser cavity with the target surface, said cavity being capable of supporting a plurality of modes each with a different axial mode index,
   an amplifying medium for providing multimode operation,
   a phase modulator positioned to modulate the signals in said cavity,
   swept oscillator means coupled to said phase modulator for modulating the phase of the signals in said cavity at a frequency that is a function of range,
   detecting means responsive to beat signals developed in said cavity to provide a detected signal representative of the beat signal amplitude,
   and means responsive to said detecting means for determining a mode locking condition and scaling the modulating frequency of said swept oscillator means to provide a signal representative of range.

5. The combination of claim 4 further including telescope means in said cavity for increasing the cavity gain.

6. A system for measuring range to an object comprising
   a laser amplifying element and a reflective element having a reflective surface positioned for forming in a single path a laser cavity with said object, said cavity supporting a plurality of axial modes,
   first means coupled to said cavity for phase modulating the energy in said cavity at a frequency range including $c/2l$ where $c$ is the velocity of light and $l$ is the length of said cavity,
   and second means for detecting beat note signals in said cavity and sensing cavity mode locking at the modulating frequency $c/2l$, and coupled to said first means for providing a signal representative of the cavity length $l$ representative of range to the target.

7. The combination of claim 6 in which said second means includes a threshold detector for detecting a rise in amplitude of said beat note signals as a condition for providing the signal representative of the cavity length $l$.

8. A system for measuring range to an object comprising
   a reflective element positioned with a path to said object for forming a laser cavity with said object,
   an amplifying element positioned in said cavity, said cavity supporting a plurality of modes each with a different axial mode index,
   modulating means for phase modulating the energy in said cavity,
   a swept oscillator coupled to said modulating means for providing a phase modulation over a frequency excursion including a mode locking frequency,
   photomultiplier means responsive to the difference signals in said cavity, tracking means coupled to said photomultiplier for passing the difference signals in a frequency range at said mode locking frequency, envelope detecting means coupled to said tracking means for developing a signal representative of the amplitude of the difference signals passed by said tracking means, threshold detecting means coupled to said envelope detecting means for providing a signal representative of said mode locking condition, and output means coupled to said threshold detecting means and said swept oscillator for providing a signal representative of range to said object.

9. The combination of claim 8 further including telescope means in said cavity.

10. The combination of claim 8 in which said threshold detecting means responds to the signal from said envelope detecting means falling in amplitude over a predetermined time interval.

11. The combination of claim 10 with said output means including a bias correction means for correcting change as a function of said predetermined time interval.

12. The combination of claim 8 in which said threshold detecting means senses a substantial rise in amplitude of the signal developed by said envelope detecting means.

13. The combination of claim 8 in which range selection means are coupled to said swept oscillator for selecting different phase modulation frequency excursions representative of different range intervals.

* * * * *